(12) United States Patent
Feick et al.

(10) Patent No.: US 7,722,351 B2
(45) Date of Patent: May 25, 2010

(54) INJECTION MOLDING APPARATUS HAVING MAGNETIC VALVE PIN COUPLING

(75) Inventors: Murray Feick, Kitchener (CA); Fabrice Fairy, Georgetown (CA); Stefan Engleder, Guelph (CA); Douglas Ursu, Orangeville (CA)

(73) Assignee: Mold-Masters (2007) Limited, Georgetown (CA)

( * ) Notice: Subject to any disclaimer, the term of this patent is extended or adjusted under 35 U.S.C. 154(b) by 219 days.

(21) Appl. No.: 11/876,706

(22) Filed: Oct. 22, 2007

(65) Prior Publication Data

US 2009/0102099 A1    Apr. 23, 2009

(51) Int. Cl.
B29C 45/23 (2006.01)
(52) U.S. Cl. ............... 425/564; 425/566; 264/328.9
(58) Field of Classification Search .............. 425/562, 425/563, 564, 565, 566; 264/328.9
See application file for complete search history.

(56) References Cited

U.S. PATENT DOCUMENTS

| 3,887,312 | A | 6/1975 | Seary |
| 5,334,010 | A | 8/1994 | Teng |
| 6,309,208 | B1 * | 10/2001 | Kazmer et al. ............. 425/562 |
| 7,121,820 | B2 | 10/2006 | Tooman et al. |
| 7,131,834 | B2 | 11/2006 | Babin et al. |
| 7,210,922 | B1 | 5/2007 | Kohler |
| 7,270,537 | B2 * | 9/2007 | Doyle et al. ............... 425/562 |
| 7,275,923 | B2 | 10/2007 | Tooman et al. |
| 7,316,553 | B2 | 1/2008 | Teng et al. |
| 7,341,445 | B2 | 3/2008 | Paris et al. |
| 2005/0048162 | A1 | 3/2005 | Teng et al. |
| 2006/0222731 | A1 | 10/2006 | Paris et al. |

FOREIGN PATENT DOCUMENTS

| CA | 2366321 A1 | 7/2001 |
| DE | 196 11 880 A1 | 10/1997 |
| JP | 1-97924 | 6/1989 |
| JP | 2000-061995 A | 2/2000 |
| JP | 2001-193596 A | 7/2001 |
| KR | 10-0514235 | 9/2005 |
| KR | 10-0655750 B | 12/2006 |
| WO | WO-2006/080807 A1 | 8/2006 |

OTHER PUBLICATIONS

"International Search Report and Written Opinion", International Application No. PCT/CA2008/001861 Jan. 20, 2009.
Baumann, Martin et al., "Electrically Actuated Valve Gates: An Emerging Hot Runner Technology", *MoldMaking Technology* Aug. 2008, pp. 31-34.
Gray, Stephen et al., "Plate Actuated Hot Runner Valve Gates for Improved Part Quality and Molding Process Consistency", *ANTEC* 2009, pp. 2991-2995.

* cited by examiner

*Primary Examiner*—Tim Heitbrink
(74) *Attorney, Agent, or Firm*—Medler Ferro PLLC

(57) ABSTRACT

A magnetic coupling for an injection molding apparatus, such as a hot half or hot runner, includes a first magnetic part for connection to an actuator, a valve pin plate, or the like and a movable second magnetic part for connection to a valve pin. The first magnetic part and the second magnetic part are coupled by a magnetic force. The first magnetic part can be part of the actuator. The second magnetic part can be part of the valve pin. A valve pin plate can be provided for a plurality of valve pins.

23 Claims, 16 Drawing Sheets

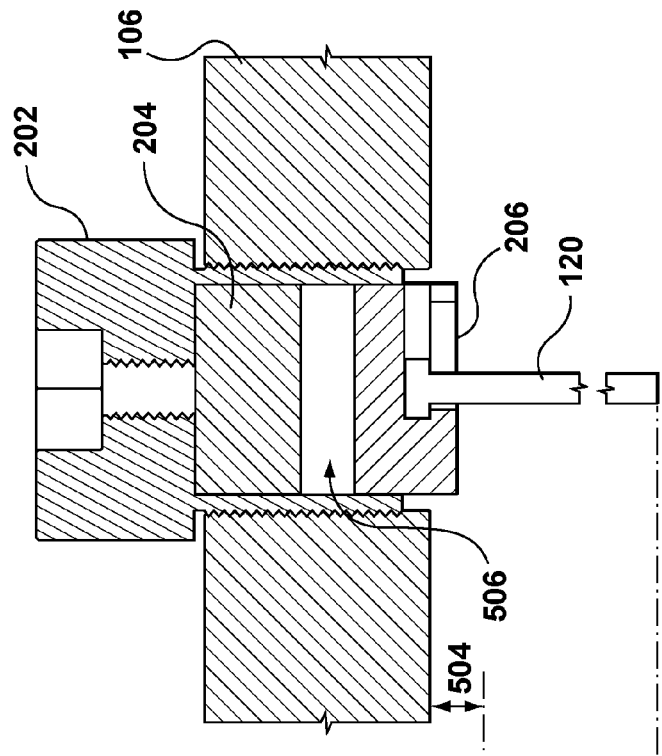
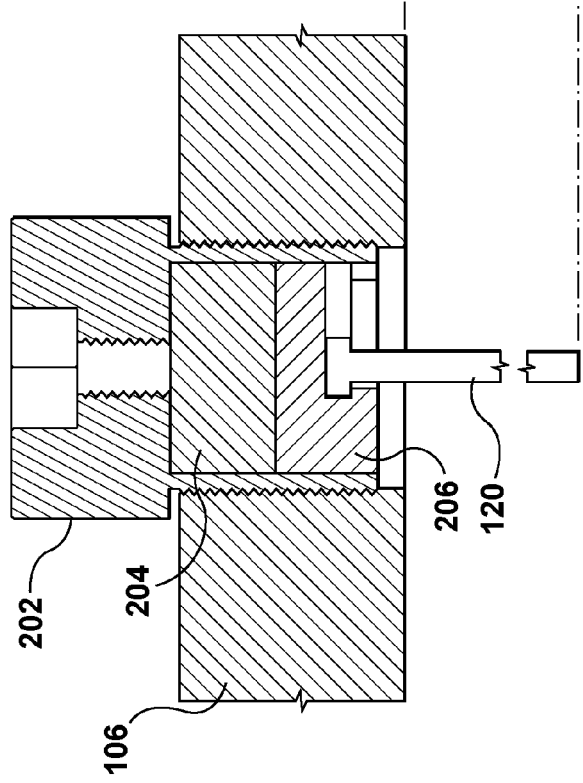
FIG. 5a
FIG. 5b

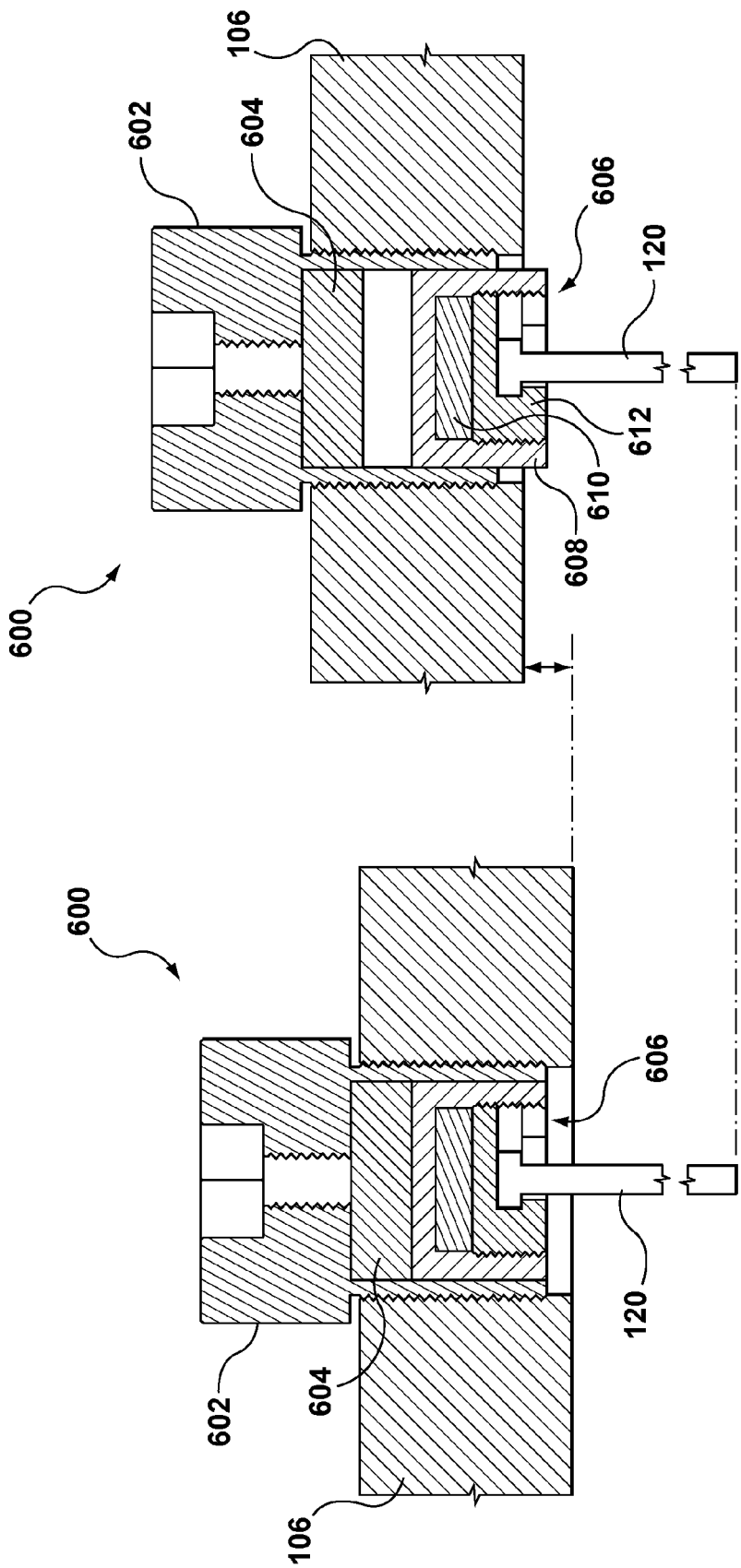

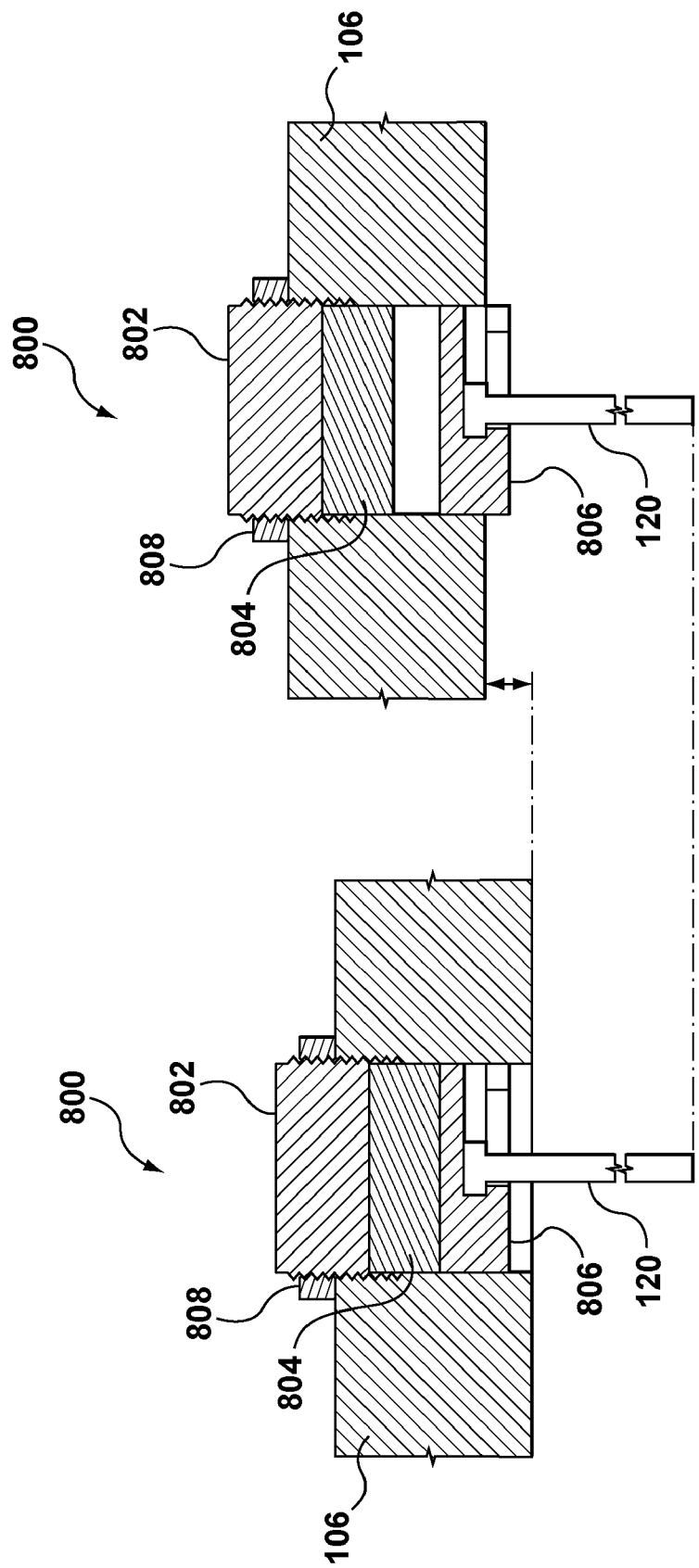

INJECTION MOLDING APPARATUS HAVING MAGNETIC VALVE PIN COUPLING

BACKGROUND OF THE INVENTION

1. Field of the Invention

This invention is relates to an injection molding apparatus, and more particularly, an injection molding apparatus having a valve pin.

2. Related Art

Injection molding apparatuses, such as hot halves and hot runners, commonly use valve pins to control flow of molding material.

When a cavity, valve pin, heater, mold gate, or other related component wears or fails, the molded product may have defects and the injection molding apparatus may have to be shut down for maintenance or repair. Such downtime eats into production time, which is nearly always sought to be maximized.

SUMMARY OF THE INVENTION

A magnetic coupling for an injection molding apparatus, such as a hot half or hot runner, includes a first magnetic part for connection to an actuator, a valve pin plate, or the like and a movable second magnetic part for connection to a valve pin. The first magnetic part and the second magnetic part are coupled by a magnetic force. The first magnetic part can be part of the actuator. The second magnetic part can be part of the valve pin. A valve pin plate can be provided for a plurality of valve pins.

BRIEF DESCRIPTION OF THE FIGURES

Embodiments of the present invention will now be described more fully with reference to the accompanying drawings, where like reference numbers indicate similar structure.

FIGS. 5a and 5b are cross-sectional views of one of the magnetic couplings of FIG. 1 shown in various positions.

FIGS. 6a and 6b are cross-sectional views of a magnetic coupling according to another embodiment of the present invention.

FIGS. 8a and 8b are cross-sectional views of a magnetic coupling according to another embodiment of the present invention.

DETAILED DESCRIPTION OF THE INVENTION

Figure 1:
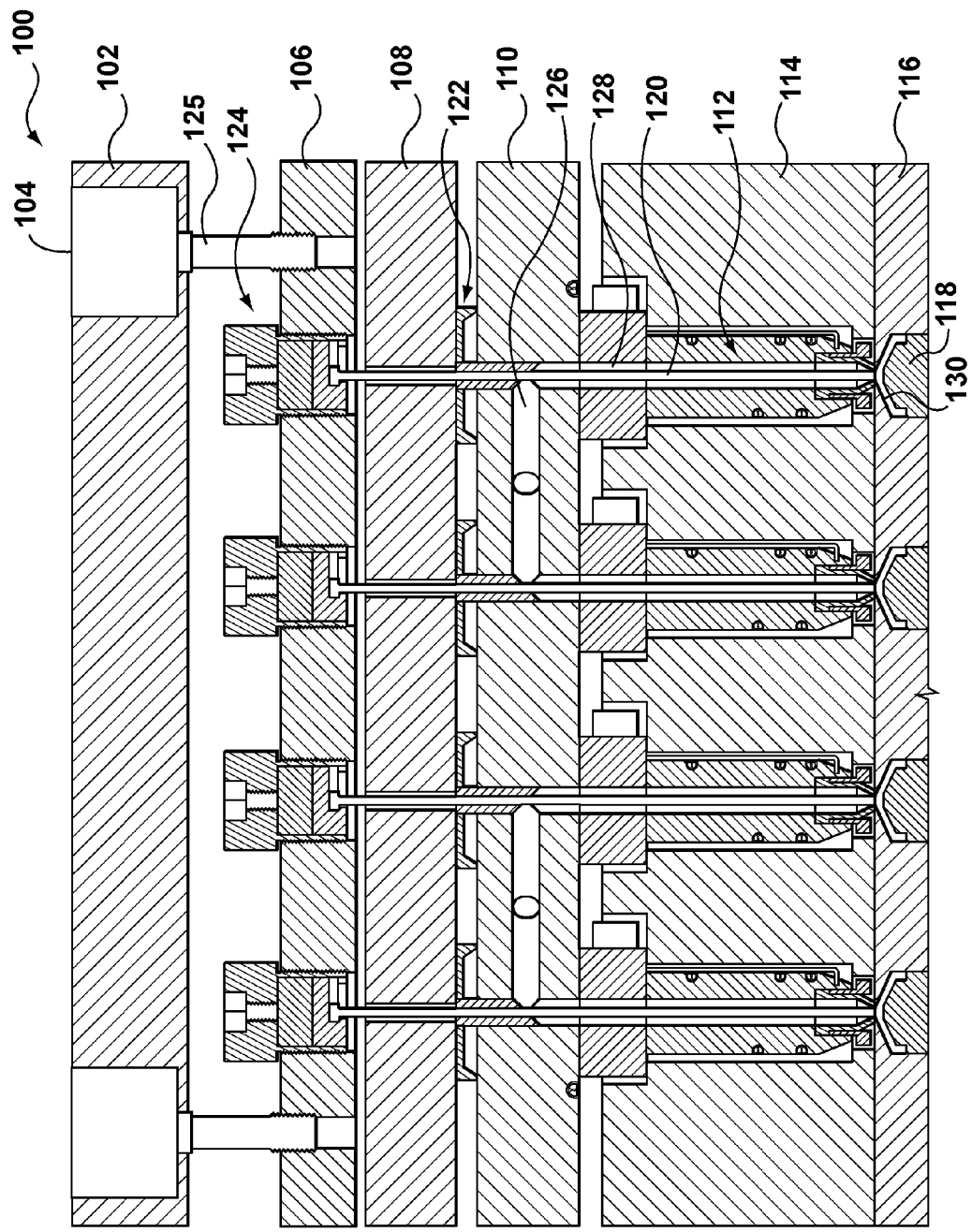
FIG. 1 is a cross-sectional view of an injection molding apparatus according to an embodiment of the present invention.

FIG. 1 shows an injection molding apparatus 100 according to an embodiment of the present invention. The features and aspects described for the other embodiments can be used accordingly with the present embodiment.

The injection molding apparatus includes an actuator plate 102, actuators 104, a valve pin plate 106, a back plate 108, a manifold 110, nozzles 112, a mold plate 114, a cavity plate 116, cores 118, valve pins 120, valve pin bushings 122, and magnetic couplings 124. The injection molding apparatus 100 can include any number of manifolds and nozzles, in any configuration. In this embodiment, one manifold is shown for simplicity. The injection molding apparatus 100 can include additional components, such as mold plates, alignment dowels, mold gate inserts, and cooling channels, among others.

The actuator plate 102 has openings for accommodating the actuators 104. If the actuators 104 depend on a working fluid for operation (i.e., pneumatic or hydraulic types), fluid conduits can be provided in the actuator plate 102. Should the actuators 104 be electric or magnetic or of some other design, electrical conduits can be provided.

The actuators 104 are disposed in the actuator plate 102 and can be pneumatic, hydraulic, electric, magnetic, or of some other design. The actuators 104 can translate the valve pin plate 106 by linear motion (e.g., a pneumatic piston) or rotary motion (e.g., an electric screw drive). To accomplish this, each actuator 104 has a stationary part (e.g., a housing or cylinder) connected to the actuator plate 102 and has a movable part 125 (e.g., a piston) connected to the valve pin plate 106. The number of actuators is a design choice, and in other embodiments more or fewer actuators can be used. Any style of actuator is suitable, provided that it can move the valve pin plate 106.

The valve pin plate 106 is connected to the movable part 125 of each actuator 104. The valve pin plate 106 has a plurality of threaded openings for receiving the magnetic couplings 124. The valve pin plate 106 can move up and down in response to the actuation of the actuators 104. The valve pin plate 106 need not be a plate as such, but can be any rigid member capable of connecting one or more actuators to a plurality of magnetic couplings. In other embodiments, the valve pin plate 106 is an assembly of stacked plates.

The back plate 108 is disposed between the valve pin plate 106 and the valve pin bushings 122 and serves to secure the valve pin bushings 122 in the manifold 110. The back plate 108 has several bores through which the valve pins 120 extend.

The manifold 110 defines a manifold channel 126 and includes a manifold heater. The manifold channel 126 receives molding material (e.g., plastic melt) from an inlet (not shown) or an upstream manifold (not shown). The manifold heater can be of any design, such as the insulated resistance wire illustrated. It should also be mentioned that, because of the plate interconnections (not shown), the manifold 110 is stationary relative to the stationary parts of the actuators 104.

The nozzles 112 are connected to the manifold 110 and each nozzle 112 defines one of a plurality of nozzle channels 128 in communication with the manifold channel 126. In this embodiment, each nozzle 112 includes a nozzle body, a nozzle flange, a nozzle heater embedded in the nozzle body, a thermocouple, a terminal end for connecting the heater to a power source, a nozzle tip, and a tip retainer. The nozzles 112 in combination with the manifold 110 define a hot runner.

The mold plate 114 has wells to accommodate and support the nozzles 112. The wells are sized to thermally insulate the nozzles 112 from the surrounding material.

The cavity plate 116 and the cores 118 define cavities 130, and the cavity plate 116 defines mold gates leading to the cavities 130. The cavity plate 116 and cores 118 are separable from the mold plate 114 along a parting line to allow ejection of molded products from the cavities 130. In other embodiments, a single cavity can be fed molding material by several nozzles 112.

Each of the valve pins 120 extends from one of the magnetic couplings 124 to one of the nozzles 112 for controlling flow of molding material through the mold gates and into the cavities 130.

Each valve pin bushing 122 is held to the manifold 110 by the back plate 108. Each valve pin bushing 122 includes a disc-shaped main body and a cylindrical bushing portion connected to and extending from the main body and into the manifold 110. Each valve pin bushing 122 has a valve pin bore, which creates a seal with the valve pin 120 while still allowing the valve pin 120 to slide.

Each magnetic coupling 124 couples a respective valve pin 120 to the valve pin plate 106. Each magnetic coupling 124 directly transmits actuator closing force to the respective valve pin 120 when the valve pins 120 are being closed (i.e., moved down). Each magnetic coupling 124 also applies a magnetic force to move the respective valve pin 120 when the valve pins 120 are being opened (i.e., moved up). During normal operation, the magnetic force is sufficient to keep the valve pins 120 coupled to the valve pin plate 106 when the valve pins 120 are opened and closed. If one of the valve pins becomes immovable, the respective magnetic force is overcome by an actuator opening force so that the valve pin plate 106 and remaining valve pins 120 move (i.e., up) with respect to the immovable valve pin. The magnetic couplings 124 are described in more detail below. It should be noted that the directions indicated above are reversed if the valve pins 120 are designed to open flow of molding material when moved down and to close flow when moved up.

Figure 2:
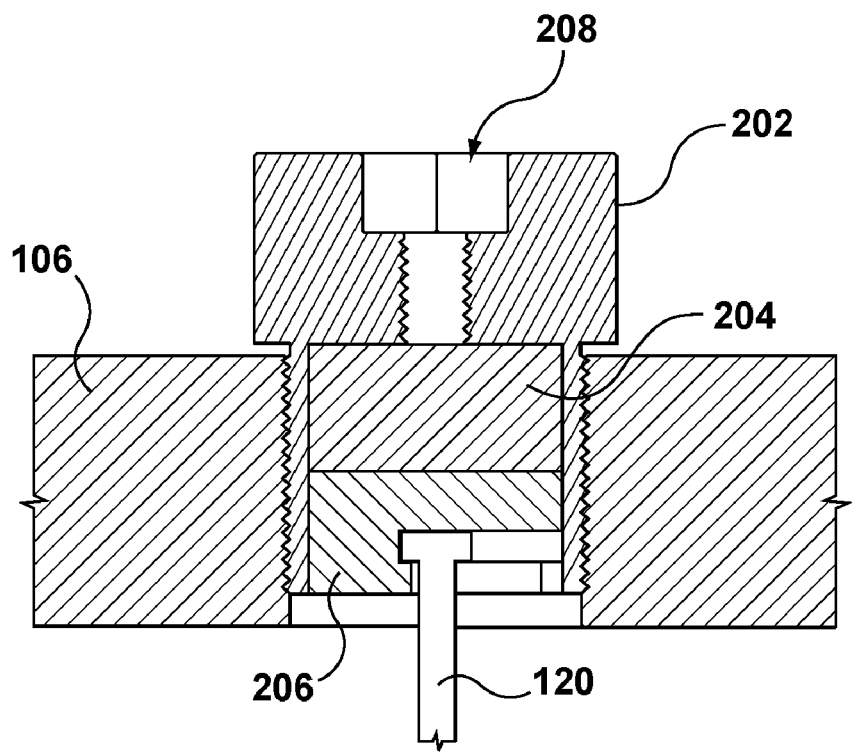
FIG. 2 is a cross-sectional view of one of the magnetic couplings of FIG.

FIG. 2 is a cross-sectional view of one of the magnetic couplings 124. The magnetic coupling 124 includes a housing 202, a first magnetic part 204, and a second magnetic part 206.

The housing 202 connects the first magnetic part 204 to the valve pin plate 106. The housing 202 is threaded into a threaded bore of the valve pin plate 106. A bore 208, which can also be threaded, is provided through the back end of the housing 202.

The first magnetic part 204 is connected to the valve pin plate 106 via the housing 202 and thus moves with the valve pin plate 106. The first magnetic part is 204 is inserted into the housing 202 and fixed to the housing 202 by way of magnetic attraction when the housing 202 is made of a magnetically responsive material such as steel. If the housing 202 is not made of a magnetically responsive material or if additional fixing force is required, an adhesive or a tight friction fit can be used, for example. A tool can be inserted into the bore 208 of the housing 202 to push the first magnetic part 204 free from the housing 202.

The second magnetic part 206 is positioned below the first magnetic part 204 and close enough to establish a magnetic force with the first magnetic part 204. In this embodiment, the second magnetic part 206 is attractively aligned with the first magnetic part 204 and the resulting the magnetic force is an attractive magnetic force. The second magnetic part 206 is slidable in the housing 202 and is thus moveable with respect to the first magnetic part 204. The second magnetic part 206 has a T-shaped slot for receiving the head of the valve pin 120, so that the second magnetic part 206 and the valve pin 120 are connected and can move together. By way of its location, the first magnetic part 204 defines a stopped position of the second magnetic part 206 relative to the first magnetic part 204 (and thus to the valve pin plate 106), and the attractive magnetic force tends to force the second magnetic part 206 into the stopped position. When the second magnetic part 206 is pulled away from the first magnetic part 204, the attractive magnetic force tends to pull the second magnetic part 206 back towards the first magnetic part 204 and into the stopped position.

In this embodiment, the first magnetic part 204 is a permanent magnet, such as a neodymium magnet or a samarium-cobalt magnet, and the second magnetic part 206 includes magnetically responsive material, such as steel, iron, or similar. The choice between a neodymium magnet, a samarium-cobalt magnet, and a magnet of some other material should be made addressing concerns such as temperature exposure and impact during operation. Magnetically responsive material can be ferromagnetic, ferrous material, or any other kind of material that experiences a significant force in the presence of a magnetic field. In this embodiment, the second magnetic part 206 is made of steel. In other embodiments, the first magnetic part 204 can be of a magnetically responsive material and the second magnetic part 206 can be a permanent magnet, or both parts 204, 206 can be some combination of permanent magnets and electromagnets.

Figure 3:
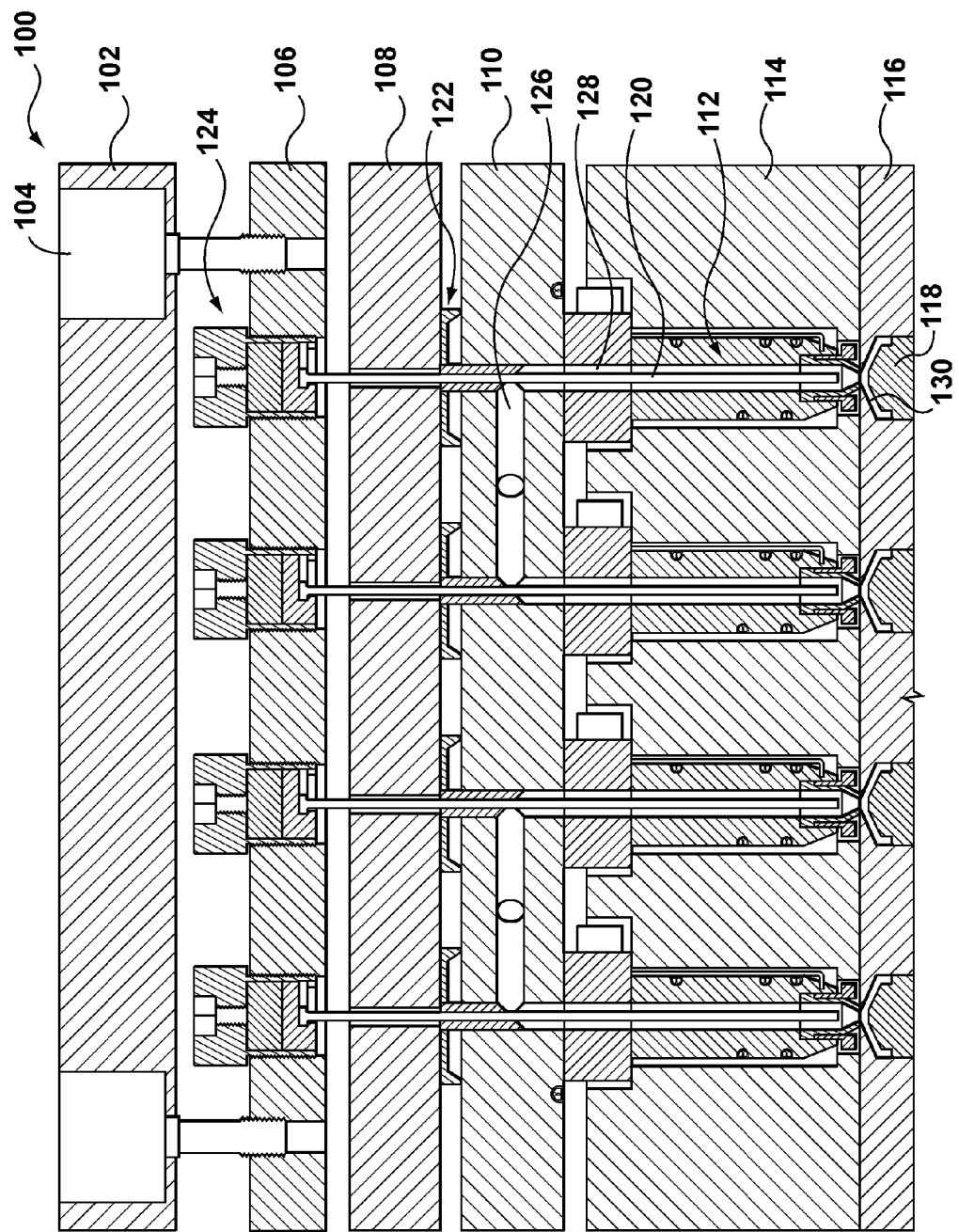
FIG. 3 is a cross-sectional view of the injection molding apparatus of FIG. 1 showing the valve pins in their opened positions.

In FIG. 1 the valve pins 120 are in their closed positions, such that molding material is prevented from flowing through the mold gates and into the cavities 130. FIG. 3, on the other hand, shows the valve pins 120 in their opened positions, such that molding material can flow through the mold gates and into the cavities 130. As can be seen in FIG. 3, the actuators 104 have moved the valve pin plate 106 up thereby moving the magnetic couplings 124, which, by way of attractive magnetic forces, pull the valve pins 120 up. When the valve pins 120 are to be returned to their closed positions (FIG. 1), the valve pin plate 106 moves down, which causes the magnetic couplings 124 to rigidly (i.e., independently of magnetic forces) push the valve pins 120 down.

Figure 4:
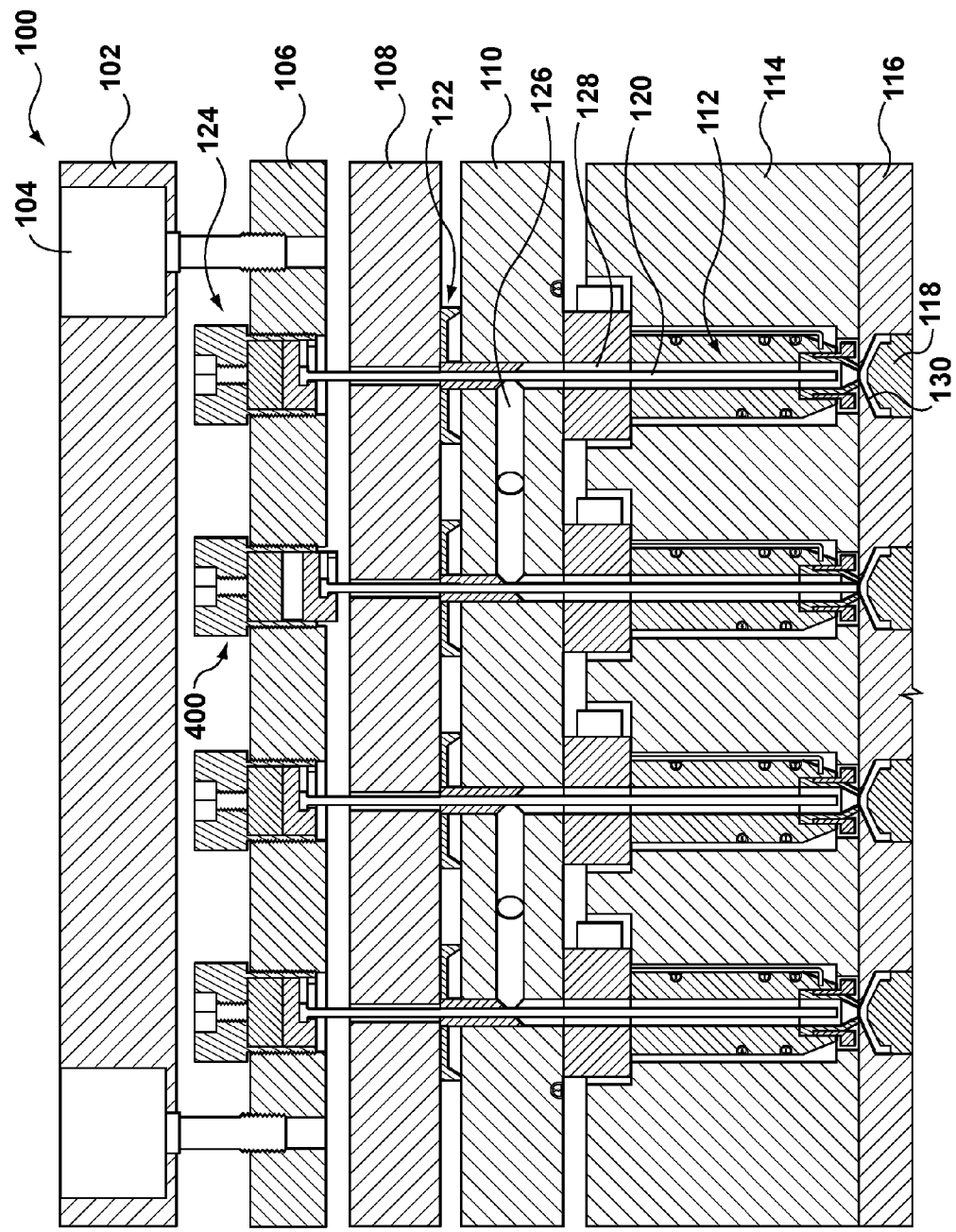
FIG. 4 is a cross-sectional view showing one of the valve pins of FIG. 1 immovable.

FIG. 4 is a cross-sectional view showing one of the valve pins 120 that has become immovable, held in the closed position by an immobilizing force. As can be seen, three of the valve pins 120 are open, as pulled by the valve pin plate 106 via the magnetic couplings 124; while one valve pin 120 is closed (at 400), despite the pull of the valve pin plate 106. As shown, the magnetic coupling 124 connected to the closed valve pin 120 has reacted to the immobilizing force and has extended to compensate for the movement of the valve pin plate 106. In one example, the immobilizing force is provided by solidified molding material resulting from the nozzle heater being shut down. That is, when a nozzle is to be taken out of service because of a worn valve pin or leaking cavity, the nozzle's heater can be shut down to stop molding material from flowing. Solidified molding material can also occur if a nozzle heater fails. When the magnetic couplings 124 are designed to have a magnetic force less than the expected immobilizing force, then the magnetic couplings 124 will allow for continued operation of valve pins when one or more nozzles are taken out of service.

In this embodiment, a selected nozzle 112 can be taken out of service by closing the valve pins 120, shutting down the selected nozzle's heater, and then waiting until molding material in the selected nozzle's channel has solidified or sufficiently cooled to provide a strong enough immobilizing force. Afterwards, the injection molding apparatus 100 can be restarted as usual, and the valve pin 120 of the immobilized nozzle will remain stationary by virtue of the magnetic coupling 124. The magnetic coupling 124 is also amenable to use with other methods of taking a nozzle out of service.

FIGS. 5a and 5b show a magnetic coupling 124 associated with an immobilized valve pin 120. FIG. 5a shows the valve pin plate 106 down and the valve pin 120 closed, while FIG. 5b shows the valve pin plate 106 up and the valve pin 120 still closed. As indicated at 502, the valve pin 120 stays in the closed position even though the valve pin plate 106 has moved upwards by a distance 504 (which, in this embodiment, is equivalent to the valve pin travel). The first magnetic part 204 has moved upwards relative to the second magnetic part 206, which has remained stationary with the fixedly connected valve pin 120. Viewed with the valve pin plate taken as a reference, the second magnetic part 206 has slid within the housing 202 away from the first magnetic part 204. As such, a gap 506 (which, in this embodiment, is also equivalent to the valve pin travel) separates the first and second magnetic parts 204, 206. The attractive magnetic force can be viewed as acting within the gap 506 to tend to bring the first and second magnetic parts 204, 206 closer together.

FIGS. 6a and 6b show a magnetic coupling 600 according to another embodiment of the present invention. The magnetic coupling 600 can be used to couple a valve pin (e.g., the valve pin 120 of FIG. 1) to a valve pin plate (e.g., the valve pin plate 106 of FIG. 1). FIG. 6a shows the valve pin plate 106 down and the valve pin 120 closed, while FIG. 6b shows the valve pin plate 106 up and the valve pin 120 still closed, as in the case of an immobilized valve pin. The features and aspects described for the other embodiments can be used accordingly with the present embodiment.

The magnetic coupling 600 includes a housing 602, a first magnetic part 604, and a second magnetic part 606. The housing 602 connects the first magnetic part 604 to the valve pin plate 106, and thus the first magnetic part 604 moves with the valve pin plate 106. The magnetic coupling 600 is similar to the magnetic coupling 124 and only differences are described in detail below.

The second magnetic part 606 is positioned below the first magnetic part 604 and close enough to establish an attractive magnetic force with the first magnetic part 604. The second magnetic part 606 includes a magnet holder 608, a permanent magnet 610, and a valve pin holder 612. The magnet 610 is inserted into the magnet holder 608 and secured in place by the valve pin holder 612, which threads into the magnet holder 608. The valve pin holder 612 has a T-shaped slot for receiving the head of the valve pin 120. The magnet 606 is attractively aligned with the first magnetic part 604 and the resulting the magnetic force is an attractive magnetic force that tends to pull the second magnetic part 606 back towards the first magnetic part 604 and into the stopped position.

In this embodiment, the first magnetic part 604 is a permanent magnet, but an electromagnet could also be used. The magnet 610 could also be an electromagnet.

Figure 7A:
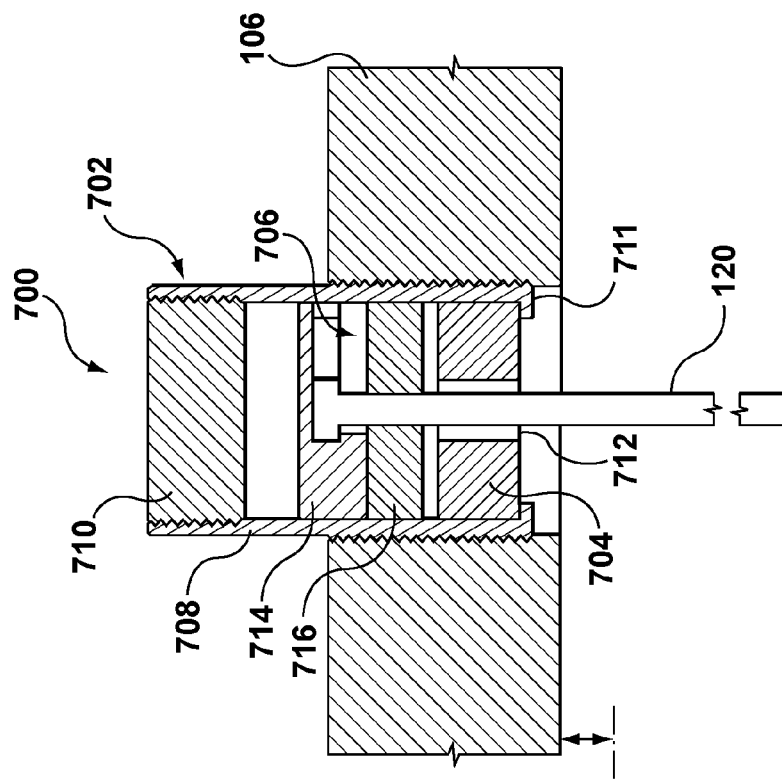
FIGS. 7a and 7b are cross-sectional views of a magnetic coupling according to another embodiment of the present invention.
Figure 7B:
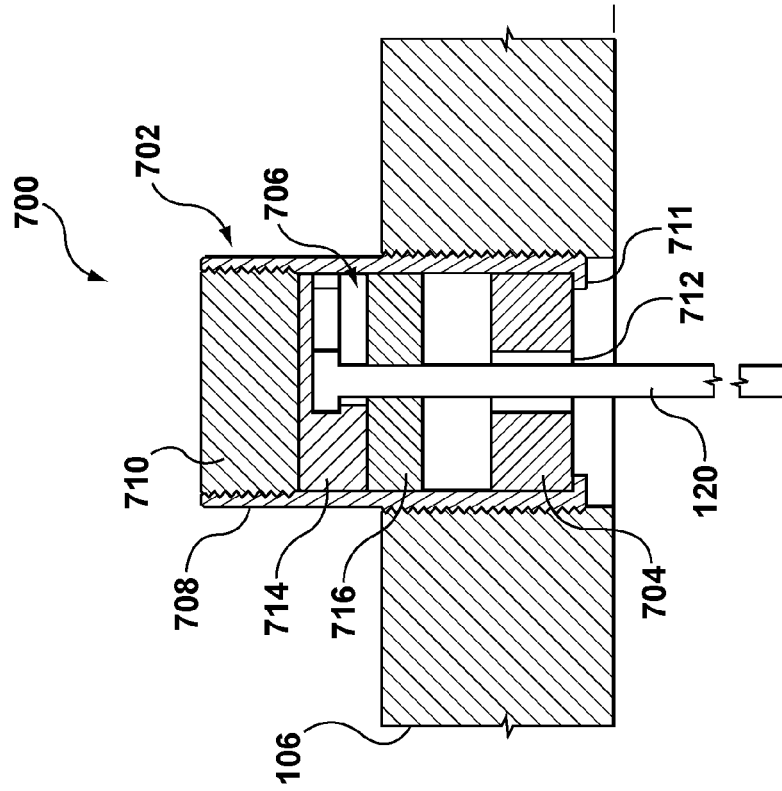

FIGS. 7a and 7b show a magnetic coupling 700 according to another embodiment of the present invention. The magnetic coupling 700 can be used to couple a valve pin (e.g., the valve pin 120 of FIG. 1) to a valve pin plate (e.g., the valve pin plate 106 of FIG. 1). FIG. 7a shows the valve pin plate 106 down and the valve pin 120 closed, while FIG. 7b shows the valve pin plate 106 up and the valve pin 120 still closed, as in the case of an immobilized valve pin. The features and aspects described for the other embodiments can be used accordingly with the present embodiment.

The magnetic coupling 700 includes a housing 702, a first magnetic part 704, and a second magnetic part 706. The housing 702 connects the first magnetic part 704 to the valve pin plate 106, and thus the first magnetic part 704 moves with the valve pin plate 106. The magnetic coupling 700 is similar to the magnetic coupling 124 and only differences are described in detail below.

The housing 702 connects the first magnetic part 704 to the valve pin plate 106. The housing includes a threaded cylindrical body 708 and a threaded stopper 710. The cylindrical body 708 is threaded into a threaded bore of the valve pin plate 106. The stopper 710 is threaded into the cylindrical body 708. The lower portion of the cylindrical body 708 has a lip 711.

The first magnetic part 704 is a magnet that is connected to the valve pin plate 106 via the housing 702 and thus moves with the valve pin plate 106. The first magnetic part is 704 is inserted into the cylindrical body 708 of the housing 702 and rests on the lip 711. If the housing 702 is made of a magnetically responsive material the first magnetic part may be attracted to the lip 711. The first magnetic part 704 need not fit tightly in the cylindrical body 708. The first magnetic part 704 has a bore 712 to accommodate the valve pin 120.

The second magnetic part includes a valve pin holder 714 and a magnet 716. The second magnetic part 706 is positioned above the first magnetic part 704 and close enough to establish a magnetic force with the first magnetic part 704. In this embodiment, the second magnetic part 706 is repulsively aligned with the first magnetic part 704 and the resulting the magnetic force is a repulsive magnetic force. To achieve this, the magnet 716 is repulsively aligned with the first magnetic part 704. The second magnetic part 706 is slidable in the housing 702 and is thus moveable with respect to the first magnetic part 704. The valve pin holder 714 has a T-shaped slot for receiving the head of the valve pin 120, so that the valve pin holder 714 and the valve pin 120 are connected and can move together. If the valve pin holder 714 is made of a magnetically responsive material, then the valve pin holder 714 is attractively connected to the magnet 716, but this is not necessary. By way of its location, the stopper 710 defines a stopped position of the second magnetic part 706 relative to the first magnetic part 704 (and thus to the valve pin plate 106). The repulsive magnetic force tends to force the second magnetic part 706 into the stopped position and tends to force the first magnetic part 704 against the lip 711. When the second magnetic part 706 is pushed towards the first magnetic part 704, the repulsive magnetic force tends to push the second magnetic part 706 back towards the stopper 710 and into the stopped position.

In normal operation, while the valve pin plate 106 moves up and down, the components of the magnetic coupling 700 stay in the relative positions shown in FIG. 7a. The stopper 710 rigidly (i.e., independently of magnetic forces) pushes the valve pin holder 714, and thus the valve pin 120, down when the valve pin plate 106 moves down; while the repulsive magnetic force is strong enough to push the magnet 716, and thus the valve pin holder 714 and the valve pin 120, up when the valve pin plate 106 moves up. However, when the valve pin 120 is immobilized in the closed position, the immobilizing force overcomes the repulsive magnetic force so that the second magnetic part 706 is held stationary while the first magnetic part 704 moves towards it against the repulsive magnetic force. As a result, the valve pin 120 can be immobilized while the remaining valve pins connected to the valve pin plate 106 can be kept in service.

In this embodiment, the first magnetic part 704 is a permanent magnet, but an electromagnet could also be used. The magnet 716 could also be an electromagnet. However, neither the first magnetic part 704 nor the magnet 716 could be replaced by magnetically responsive material, as a repulsive magnetic force would not be generated.

FIGS. 8a and 8b show a magnetic coupling 800 according to another embodiment of the present invention. The magnetic coupling 800 can be used to couple a valve pin (e.g., the valve pin 120 of FIG. 1) to a valve pin plate (e.g., the valve pin plate 106 of FIG. 1). FIG. 8a shows the valve pin plate 106 down and the valve pin 120 closed, while FIG. 8b shows the valve pin plate 106 up and the valve pin 120 still closed, as in the case of an immobilized valve pin. The features and aspects described for the other embodiments can be used accordingly with the present embodiment.

The magnetic coupling 800 includes a plug 802, a first magnetic part 804, and a second magnetic part 806. The magnetic coupling 800 is similar to the magnetic coupling 124 and only differences are described in detail below.

The plug 802 is threaded into a threaded bore of the valve pin plate 106. The plug 802 is made of magnetically attractive material and is connected (via magnetic attraction) to the first magnetic part 804, so that the first magnetic part 804 is connected to the valve pin plate 106. In other embodiments, the plug 802 is not made of magnetically responsive material and is connected to the first magnetic part 804 by an adhesive or other connective means. A lock nut 808 is also provided and is threaded to the plug 802. The lock nut 808 can be used to lock the position of the plug 802 and the first magnetic part 804, so that the normal position of the second magnetic part 806 is adjustable.

The first magnetic part is 804 is inserted into an unthreaded portion of the bore of the valve pin plate 106. The first magnetic part 804 moves with the valve pin plate 106 via its magnetic attraction to the plug 802 secured to the valve pin plate 106. In this embodiment, the first magnetic part 804 is a permanent magnet.

The second magnetic part 806 is positioned below the first magnetic part 804 and close enough to establish a magnetic force with the first magnetic part 804. In this embodiment, the second magnetic part 806 is made of magnetically responsive material and is thus attractively aligned with the first magnetic part 804 to establish an attractive magnetic force. The second magnetic part 806 is slidable in the unthreaded portion of the bore of the valve pin plate 106 and is thus moveable with respect to the first magnetic part 804. The second magnetic part 806 has a T-shaped slot for receiving the head of the valve pin 120, so that the second magnetic part 806 and the valve pin 120 are connected and can move together. By way of its location, the first magnetic part 804 defines a stopped position of the second magnetic part 806. When the second magnetic part 806 is pulled away from the first magnetic part 804, the attractive magnetic force tends to pull the second magnetic part 806 back towards the first magnetic part 804 and into the stopped position.

To adjust the normal operational position of the second magnetic part 806 and thus the valve pin 120, the lock nut 808 is first loosened, the plug 802 is then rotated in the required direction, and then the lock nut 808 is tightened again.

In this embodiment, the first magnetic part 804 is a permanent magnet, but an electromagnet could also be used. In addition, the second magnetic part 806 could include a permanent magnet or an electromagnet.

In another embodiment, the plug is made of magnetically attractive material and is considered the first magnetic part, while the second magnetic part includes a magnet that moves with a valve pin holder made of magnetically attractive material. Such embodiment is similar to that of FIG. 8 in all respects, except that the magnet is more attracted to the valve pin holder than to the plug.

Figure 9:
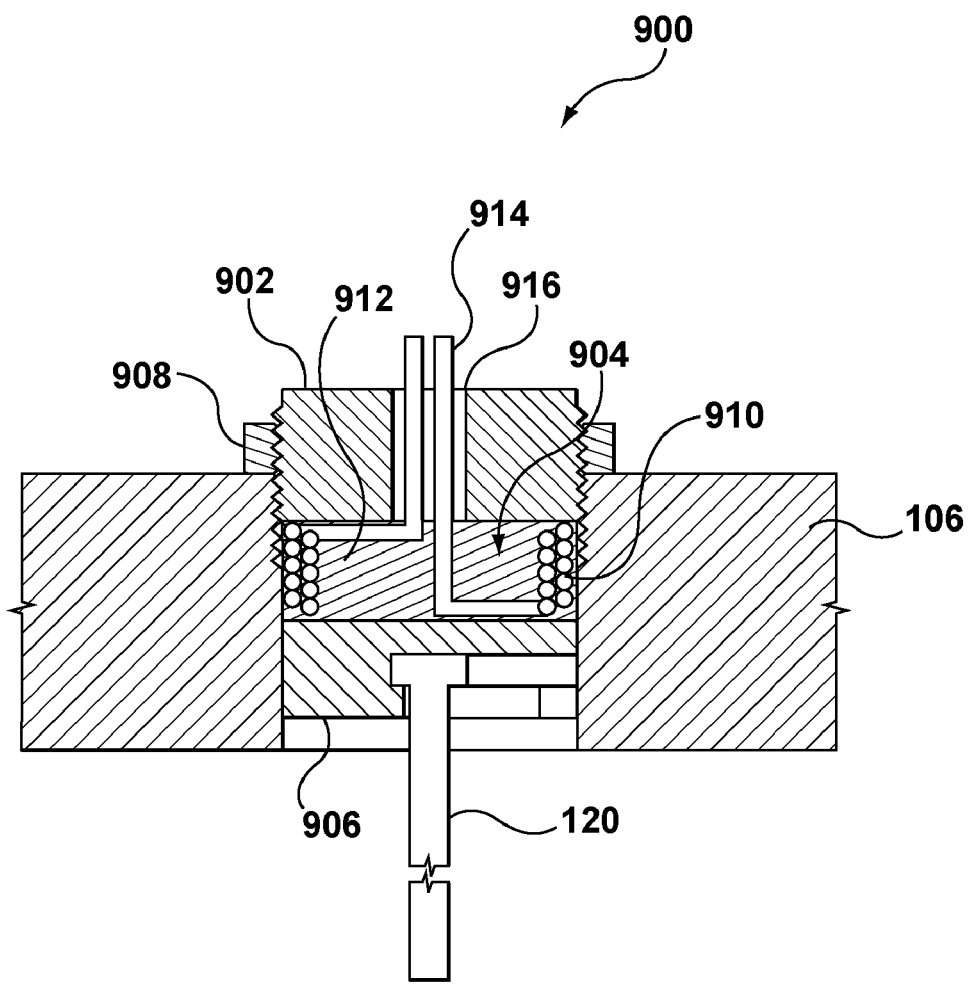
FIG. 9 is a cross-sectional view of a magnetic coupling according to another embodiment of the present invention.

FIG. 9 shows a magnetic coupling 900 according to another embodiment of the present invention. The magnetic coupling 900 can be used to couple a valve pin (e.g., the valve pin 120 of FIG. 1) to a valve pin plate (e.g., the valve pin plate 106 of FIG. 1). The features and aspects described for the other embodiments can be used accordingly with the present embodiment.

The magnetic coupling 900 includes a plug 902, a first magnetic part 904, a second magnetic part 906, and a lock nut 908. The magnetic coupling 900 is similar to the magnetic coupling 800 and only differences are described in detail below.

The first magnetic part is 904 is an electromagnet having a coil of wire 910 wrapped around or embedded within a core 912. Wire leads 914 extend out of the magnetic coupling 900 through a bore 916 in the plug 902 that acts as an electrical conduit. The wire leads 914 can be connected to a control circuit (not shown). The second magnetic part 906 is made of magnetically responsive material.

In other embodiments, where one or more electromagnets are used, electrical conduits for wire leads can be formed in any convenient component. For example, if the second magnetic part 906 is provided with an electromagnet, an electrical conduit can be provided in the valve pin plate 106. Design of such an electrical conduit can take into account movement of the second magnetic part 906 relative to the valve pin plate 106 should the valve pin 120 become immobilized.

Figure 10:
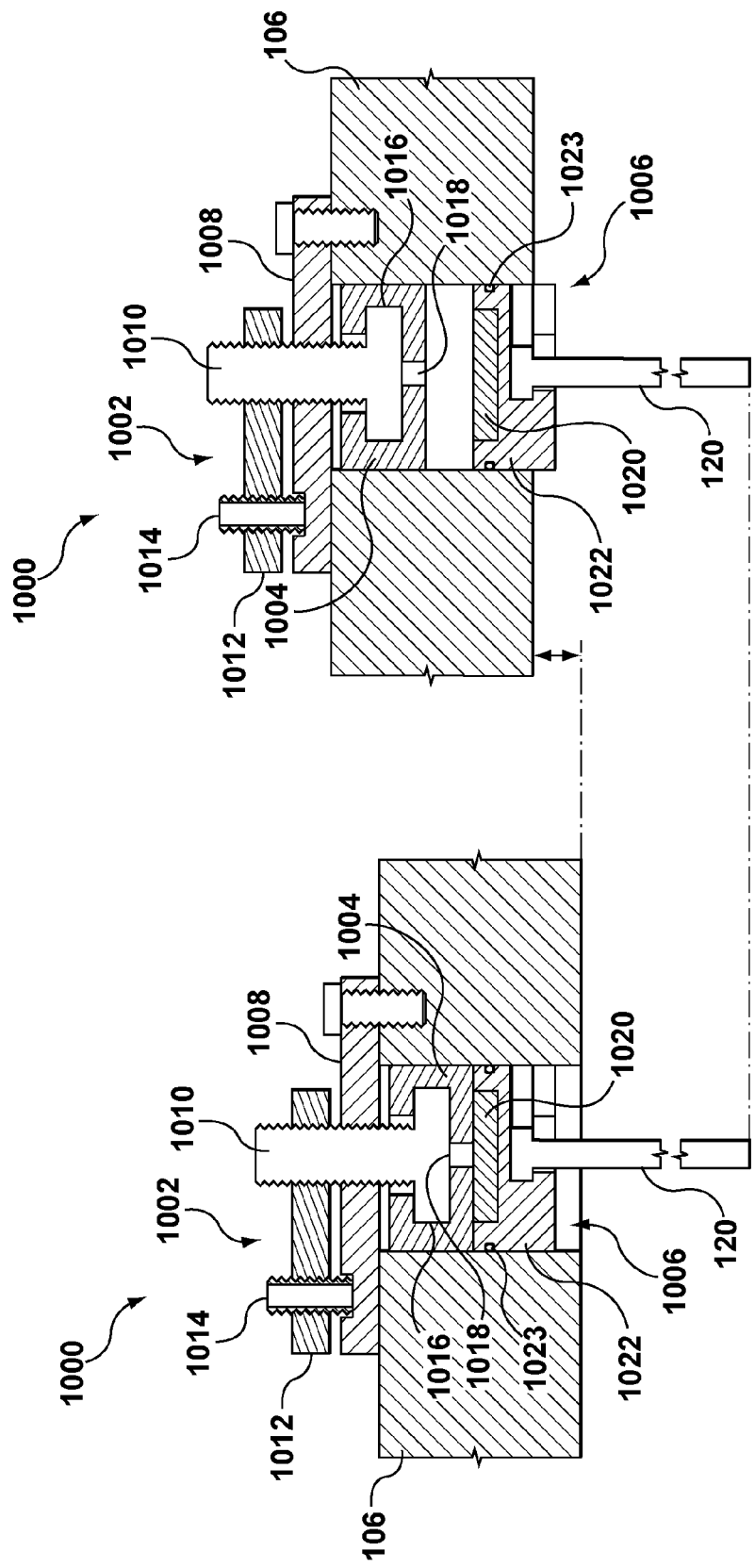
FIGS. 10a and 10b are cross-sectional views of a magnetic coupling according to another embodiment of the present invention.

FIGS. 10a and 10b show a magnetic coupling 1000 according to another embodiment of the present invention. The magnetic coupling 1000 can be used to couple a valve pin (e.g., the valve pin 120 of FIG. 1) to a valve pin plate (e.g., the valve pin plate 106 of FIG. 1). FIG. 10a shows the valve pin plate 106 down and the valve pin 120 closed, while FIG. 10b shows the valve pin plate 106 up and the valve pin 120 still closed, as in the case of an immobilized valve pin. The features and aspects described for the other embodiments can be used accordingly with the present embodiment.

The magnetic coupling 1000 includes a positioning mechanism 1002, a first magnetic part 1004, and a second magnetic part 1006. The positioning mechanism 1002 connects the first magnetic part 1004 to the valve pin plate 106, and thus the first magnetic part 1004 moves with the valve pin plate 106. The magnetic coupling 1000 is similar to the magnetic coupling 124 and only differences are described in detail below.

The positioning mechanism 1002 connects the first magnetic part 1004 to the valve pin plate 106. The positioning mechanism 1002 includes a base plate 1008, a positioning bolt 1010, a lock plate 1012, and a lock bolt 1014. The base plate 1008 is bolted or otherwise fixed to the valve pin plate 106 and has a threaded bore for receiving the positioning bolt 1010. The positioning bolt 1010 threads into the base plate 1008 and the lock plate 1012 and has a head that connects to the first magnetic part 1004. The lock plate 1012 is located near the base plate 1008 and has threaded bores for the positioning bolt 1010 and the lock bolt 1014. The lock bolt 1014 threads into the lock plate 1012 and can be tightened to butt against the base plate 1008. When the normal position of the valve pin 120 is to be adjusted, the position of the first magnetic part 1004 is adjusted by first turning the lock bolt 1014 until the lock plate 1012 is parallel with the base plate 1008, turning the positioning bolt 1010 until the valve pin 120 is in the required position, and then turning the lock bolt 1014 again to tilt the lock plate 1012 with respect to the base plate 1008 to effectively jam the thread of the positioning bolt 1010 in the threaded bore of the base plate 1008. The jamming of the positioning bolt 1010 is nonpermanent and simply serves to inhibit rotation of the positioning bolt 1010 and thereby lock the position of the first magnetic part 1004 and thus the normal position of the valve pin 120.

The first magnetic part 1004 has a non-circular cross-section to fit in a like-shaped opening of the valve pin plate 106. This prevents rotation of the first magnetic part 1004 when the positioning bolt 1010 is rotated for adjustment. The first magnetic part 1004 includes an open-ended T-shaped slot 1016 for removably holding the head of the positioning bolt 1010, as well as a bore 1018 through which a tool can be inserted to push the second magnetic part 1006 free from the first magnetic part 1004. In this embodiment, the first magnetic part 1004 is made of magnetically responsive material.

The second magnetic part 1006 is positioned below the first magnetic part 1004 and close enough to establish a magnetic force with the first magnetic part 1004. In this embodiment, the second magnetic part 1006 is attractively aligned with the first magnetic part 1004 and the resulting the magnetic force is an attractive magnetic force. The second magnetic part 1006 includes a permanent magnet 1020 that establishes the attractive magnetic force and a valve pin holder 1022. The magnet 1020 is fixed inside a recess of the valve pin holder 1022 using a friction fit, an adhesive, or the like. O-rings 1023 or similar seals are provided between the valve pin holder 1022 and the valve pin plate 106. The valve pin holder 1022 has a T-shaped slot for receiving the head of the valve pin 120, so that the second magnetic part 1006 and the valve pin 120 are connected and can move together. By way of its location, the first magnetic part 1004 defines a stopped position of the second magnetic part 1006 relative to the first magnetic part 1004, and the attractive magnetic force tends to pull the second magnetic part 1006 towards the first magnetic part 1004 and into the stopped position.

In another embodiment, the first magnetic part 1004 could include a permanent magnet or an electromagnet. The magnet 1020 could also be an electromagnet or could be made from magnetically responsive material.

Figure 11:
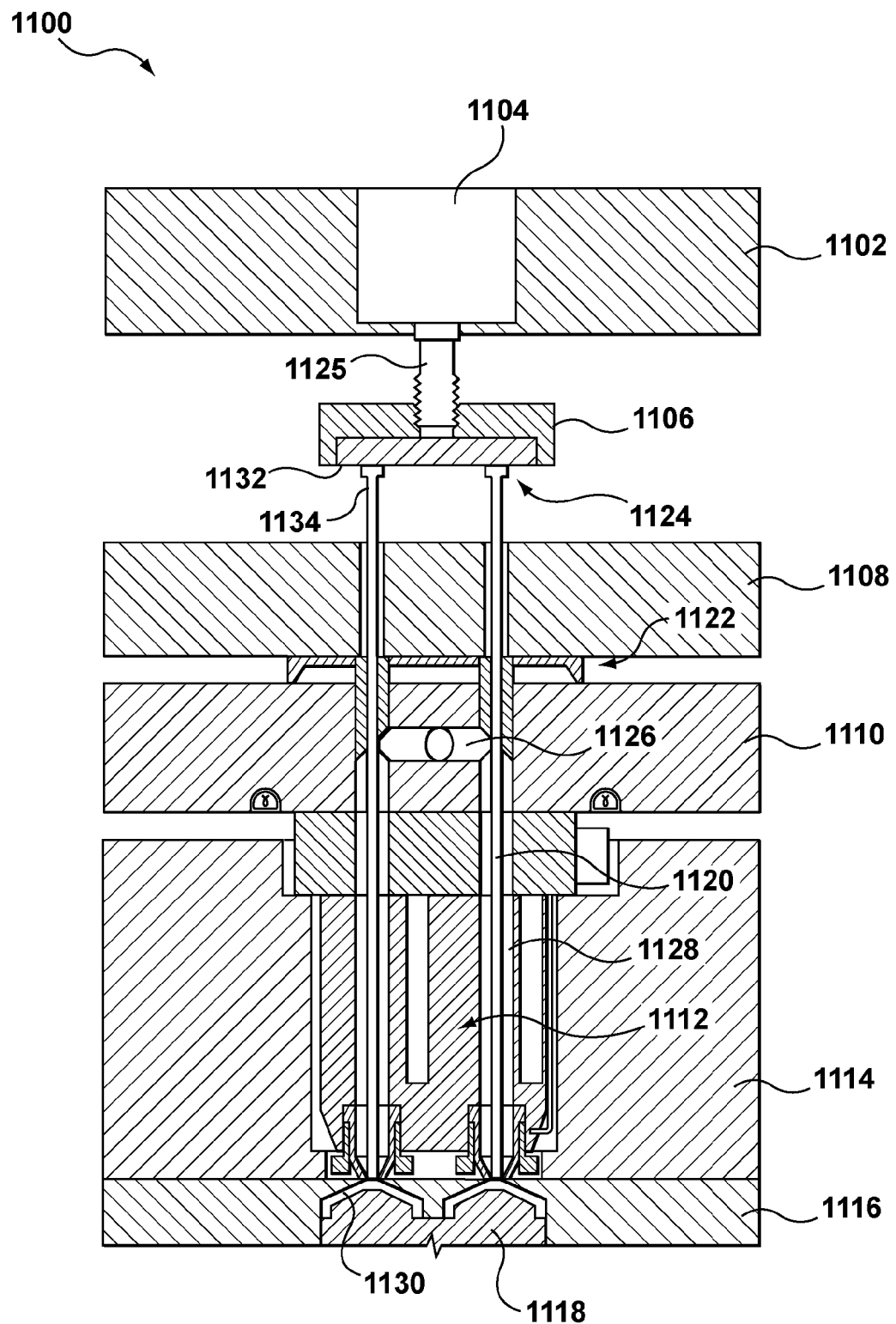
FIG. 11 is a cross-sectional view of an injection molding apparatus according to another embodiment of the present invention.

FIG. 11 shows an injection molding apparatus 1100 according to an embodiment of the present invention. The features and aspects described for the other embodiments can be used accordingly with the present embodiment.

The injection molding apparatus 1100 includes an actuator plate 1102, an actuator 1104, a valve pin plate 1106, a back plate 1108, a manifold 1110, a nozzle 1112, a mold plate 1114, a cavity plate 1116, a core 1118, valve pins 1120, a valve pin bushing 1122, and magnetic couplings 1124. The injection molding apparatus 1100 can include any number of manifolds and nozzles, in any configuration. In this embodiment, one manifold is shown for simplicity. The injection molding apparatus 1100 can include additional components, such as mold plates, alignment dowels, mold gate inserts, and cooling channels, among others.

The actuator plate 1102 has an opening for accommodating the actuator 1104. If the actuator 1104 depends on a working fluid for operation, fluid conduits can be provided in the actuator plate 1102. Should the actuator 1104 be electric or magnetic or of some other design, electrical conduits can be provided.

The actuator 1104 is disposed in the actuator plate 1102 and can be pneumatic, hydraulic, electric, magnetic, or of some other design. The actuator 1104 can translate the valve pin plate 1106 by linear motion (e.g., a pneumatic piston) or rotary motion (e.g., an electric screw drive). To accomplish this, the actuator 1104 has a stationary part connected to the actuator plate 1102 and has a movable part 1125 connected to the valve pin plate 1106. The number of actuators is a design choice, and in other embodiments more actuators can be used. Any style of actuator is suitable, provided that it can move the valve pin plate 1106.

The valve pin plate 1106 is connected to the movable part 1125 of the actuator 1104 and can move up and down in response to the actuation of the actuator 1104. The valve pin plate 1106 need not be a plate as such, but can be any rigid member capable of connecting one or more actuators to a plurality of magnetic couplings. In another embodiment, the valve pin plate 1106 is an assembly of stacked plates.

The back plate 1108 is disposed between the valve pin plate 1106 and the valve in bushing 1122 and serves to secure the valve pin bushing 1122 in the manifold 1110. The back plate 1108 has several bores through which the valve pins 1120 extend.

The manifold 1110 defines a manifold channel 1126 and includes a manifold heater. The manifold channel 1126 receives molding material (e.g., plastic melt) from an inlet (not shown) or an upstream manifold (not shown). The manifold heater can be of any design, such as the insulated resistance wire illustrated. It should also be mentioned that, because of the plate interconnections (not shown), the manifold 1110 is stationary relative to the stationary part of the actuator 1104.

The nozzle 1112 is connected to the manifold 1110 and defines a plurality of nozzle channels 1128 in communication with the manifold channel 1126. In this embodiment, the nozzle 1112 includes a nozzle body, a nozzle flange, one or more nozzle heaters (e.g., cartridge heaters) in the nozzle body, a thermocouple, a terminal end for connecting the heater(s) to a power source, nozzle tips, and tip retainers. The nozzle 1112 in combination with the manifold 1110 can define a hot runner.

The mold plate 1114 has a well to accommodate and support the nozzle 1112. The well is sized to thermally insulate the nozzle 1112 from the surrounding material.

The cavity plate 1116 and the core 1118 define cavities 1130, and the cavity plate 1116 defines mold gates leading to the cavities 1130. The cavity plate 1116 and the core 1118 are separable from the mold plate 1114 along a parting line to allow ejection of molded products from the cavities 1130.

Each of the valve pins 1120 extends from one of the magnetic couplings 1124 through one of the nozzle channels 1128 for controlling flow of molding material through the mold gates and into the cavities 1130.

The valve pin bushing 1122 is held to the manifold 1110 by the back plate 1108. The valve pin bushing 1122 includes a disc-shaped main body and cylindrical bushing portions connected to and extending from the main body and into the manifold 1110. The valve pin bushing 1122 has valve pin bores, which create seals with the valve pins 1120 while still allowing the valve pins 1120 to slide.

The magnetic couplings 1124 include a permanent magnet 1132 (first magnetic part) and a plurality of valve pin heads 1134 (second magnetic parts). The magnet 1132 is fixed to the valve pin plate 1106 and each valve pin head 1134 is fixed to or integral with one of the valve pins 1120. The magnet 1132 can be fixed to the valve pin plate 1106 by magnetic attraction, a friction fit, an adhesive, bolts, or the like. In this embodiment, the magnet 1132 is held to the magnetically responsive valve pin plate 1106 by an attractive magnetic force. The valve pin heads 1134 are positioned below the magnet 1132 and close enough to establish a magnetic force with the magnet 1132. In this embodiment, the valve pin heads 1134 are made of magnetically responsive material, so that each valve pin head 1134 is attractively aligned with the magnet 1132. The resulting the magnetic force is an attractive magnetic force that tends to pull each valve pin head 1134 towards the magnet 1132 and into a stopped position against the magnet 1132. In other embodiments, the magnet 1132 and the valve pin heads 1134 can include or be replaced by other combinations of permanent magnets, electromagnets, and magnetically responsive material. Embodiments using repulsive magnetic forces are also possible (see FIG. 7).

Each magnetic coupling 1124 couples a respective valve pin 1120 to the valve pin plate 1106. The magnet 1132 directly transmits actuator closing force to the respective valve pin head 1134 when the valve pins 1120 are being closed (i.e., moved down) by pushing on the valve pin heads 1134. The magnet 1132 also pulls the valve pins 1120 upwards by attractive magnetic forces acting on the valve pin heads 1134, when the valve pins 1120 are being opened. During normal operation, the magnetic force is sufficient to keep the valve pins 1120 coupled to the valve pin plate 1106 when the valve pins 1120 are opened and closed. If a valve pin becomes immovable, the respective attractive magnetic force is overcome, so that the immobilized valve pin is decoupled from the magnet 1132.

Figure 12:
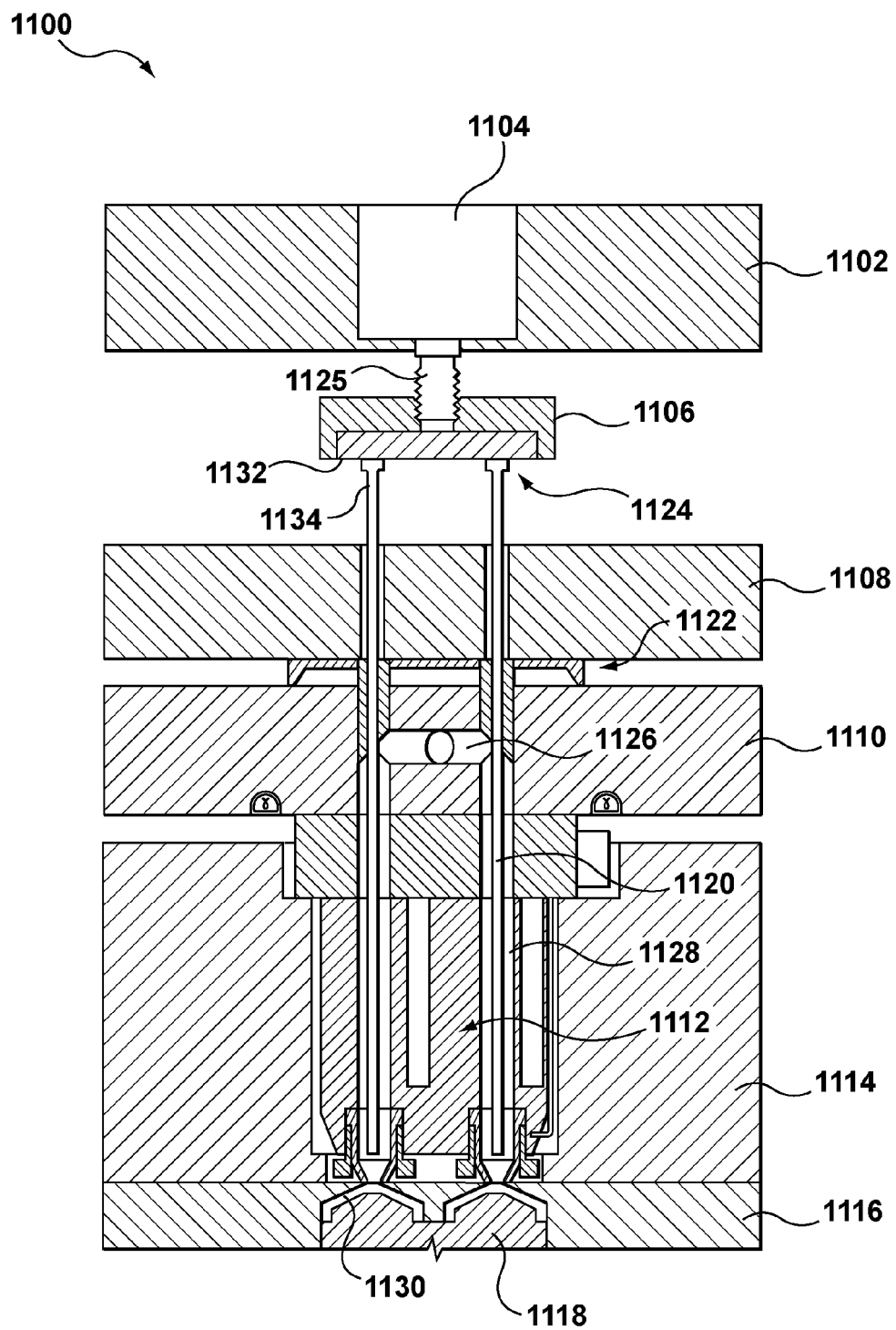
FIG. 12 is a cross-sectional view of the injection molding apparatus of FIG. 11 showing the valve pins in their opened positions.
Figure 13:
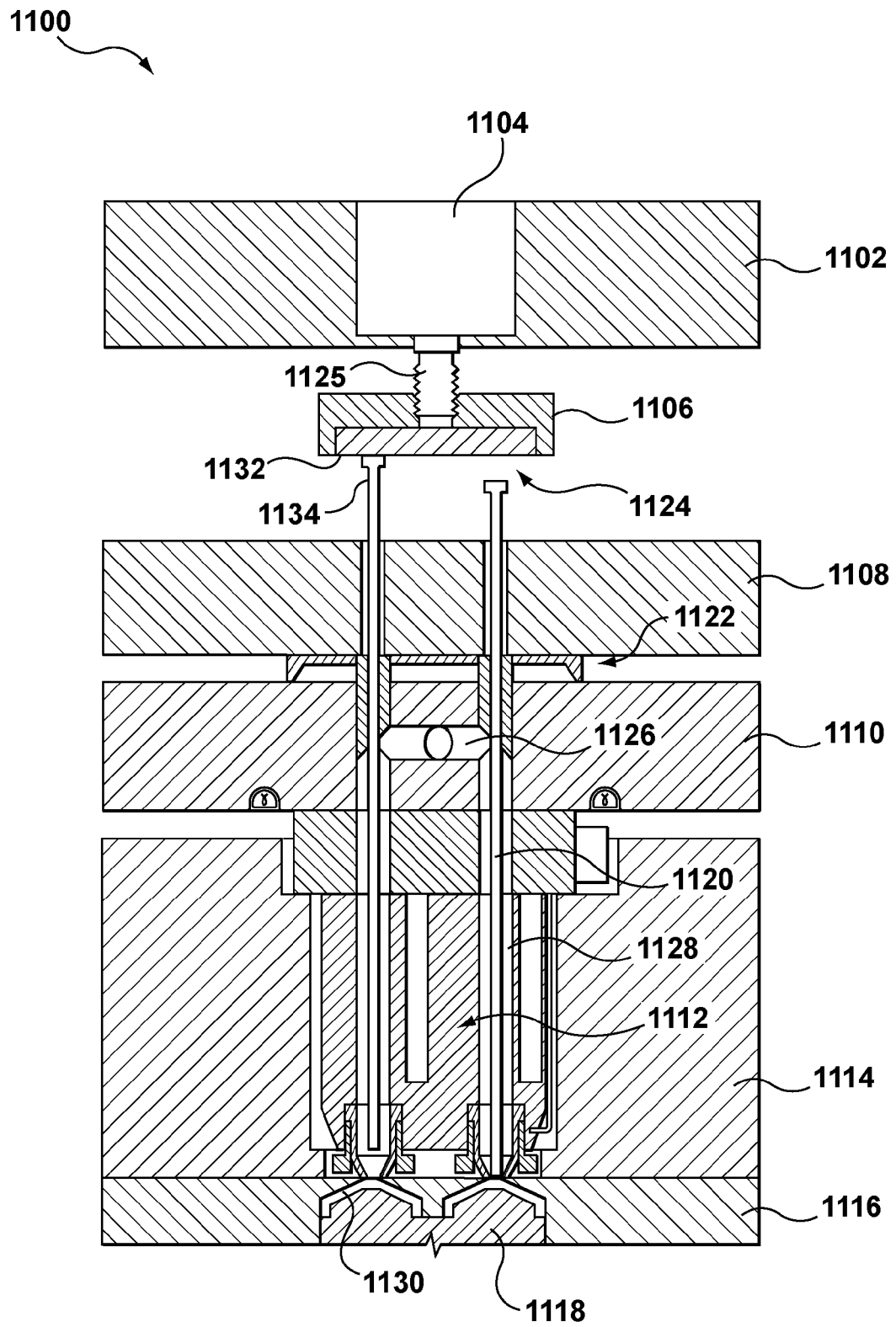
FIG. 13 is a cross-sectional view showing one of the valve pins of FIG. 11 immovable.

During normal operation the actuator 1104 opens and closes the valve pins 1120 via the magnet 1132 and the heads 1134 of the valve pins 1120. FIG. 11 shows the valve pins 1120 closed, while FIG. 12 shows the valve pins 1120 open. However, when a valve pin 1120 is immobilized (e.g., when a cavity 130 is taken out of service), the head 1134 of the valve pin 1120 decouples from the magnet 1132 when the actuator 1104 pulls the valve pin plate 1106 up, as shown in FIG. 13.

Figure 14:
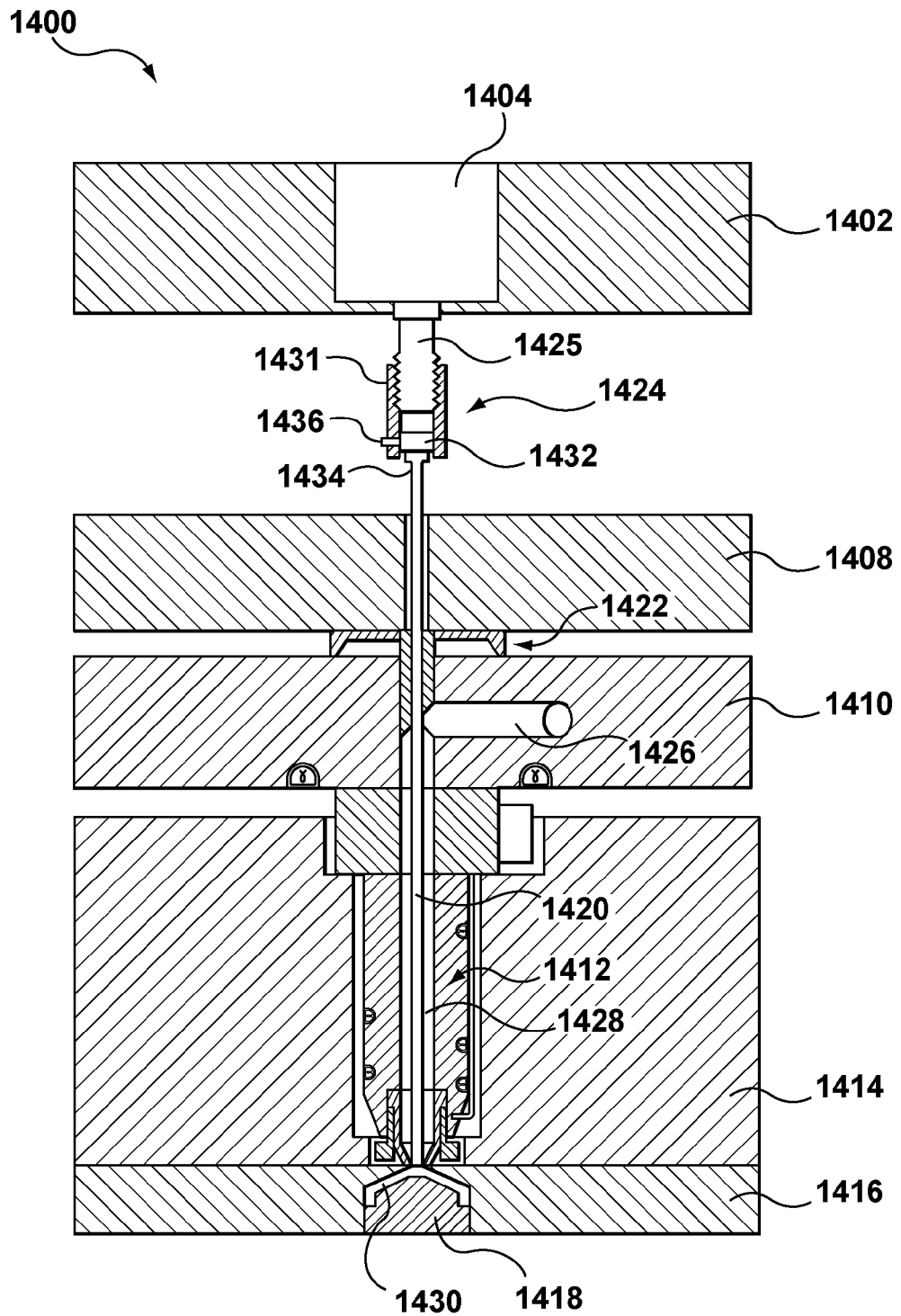
FIG. 14 is a cross-sectional view of an injection molding apparatus according to another embodiment of the present invention.

FIG. 14 shows an injection molding apparatus 1400 according to an embodiment of the present invention. The features and aspects described for the other embodiments can be used accordingly with the present embodiment.

The injection molding apparatus includes an actuator plate 1402, an actuator 1404, a back plate 1408, a manifold 1410, a nozzle 1412, a mold plate 1414, a cavity plate 1416, a core 1418, a valve pin 1420, a valve pin bushing 1422, and a magnetic coupling 1424. The injection molding apparatus 1400 can include any number of manifolds and nozzles, in any configuration. In this embodiment, one manifold and one nozzle are shown for simplicity. The injection molding apparatus 1400 can include additional components, such as mold plates, alignment dowels, mold gate inserts, and cooling channels, among others.

The actuator plate 1402 has an opening for accommodating the actuator 1404. If the actuator 1404 depends on a working fluid for operation, fluid conduits can be provided in the actuator plate 1402. Should the actuator 1404 be electric or magnetic or of some other design, electrical conduits can be provided.

The actuator 1404 is disposed in the actuator plate 1402 and can be pneumatic, hydraulic, electric, magnetic, or of some other design. The actuator 1404 can translate the magnetic coupling 1424 by linear motion (e.g., a pneumatic piston) or rotary motion (e.g., an electric screw drive). To accomplish this, the actuator 1404 has a stationary part connected to the actuator plate 1402 and has a movable part 1425.

The back plate 1408 is disposed between the magnetic coupling 1424 and the valve in bushing 1422 and serves to secure the valve pin bushing 1422 in the manifold 1410. The back plate 1408 has a bore through which the valve pin 1420 extends.

The manifold 1410 defines a manifold channel 1426 and includes a manifold heater. The manifold channel 1426 receives molding material (e.g., plastic melt) from an inlet (not shown) or an upstream manifold (not shown). The manifold heater can be of any design, such as the insulated resistance wire illustrated. It should also be mentioned that, because of the plate interconnections (not shown), the manifold 1410 is stationary relative to the stationary part of the actuator 1404.

The nozzle 1412 is connected to the manifold 1410 and defines a nozzle channel 1428 in communication with the manifold channel 1426. In this embodiment, the nozzle 1412 includes a nozzle body, a nozzle flange, a nozzle heater, a thermocouple, a terminal end for connecting the heater to a power source, a nozzle tip, and a tip retainer. The nozzle 1412 in combination with the manifold 1410 can define a hot runner.

The mold plate 1414 has a well to accommodate and support the nozzle 1412. The well is sized to thermally insulate the nozzle 1412 from the surrounding material.

The cavity plate 1416 and the core 1418 define a cavity 1430, and the cavity plate 1416 defines a mold gate leading to the cavity 1430. The cavity plate 1416 and the core 1418 are separable from the mold plate 1414 along a parting line to allow ejection of a molded product from the cavity 1430.

The valve pin 1420 extends from the magnetic coupling 1424 through the nozzle channel 1428 for controlling flow of molding material through the mold gate and into the cavity 1430.

The valve pin bushing 1422 is held to the manifold 1410 by the back plate 1408. The valve pin bushing 1422 includes a disc-shaped main body and a cylindrical bushing portion connected to and extending from the main body and into the manifold 1410. The valve pin bushing 1422 has a valve pin bore, which creates a seal with the valve pin 1420 while still allowing the valve pin 1420 to slide.

The magnetic coupling 1424 includes a housing 1431, a permanent magnet 1432 (first magnetic part), a valve pin head 1434 (second magnetic part), and a set screw 1436. The housing 1431, which in this embodiment is a simple tube, is fixed to the movable part 1425 of the actuator 1404 and the magnet 1432 is adjustably fixed in the housing 1431 by the set screw 1436, such that the magnet 1432 is fixed to the movable part 1425 of the actuator 1404. In other embodiments, the magnet 1432 can be fixed to the housing 1431 by magnetic attraction, a friction fit, an adhesive, bolts, or the like. The valve pin head 1434 is fixed to or integral with the valve pin 1420. The valve pin head 1434 is positioned below the magnet 1432 and close enough to establish a magnetic force with the magnet 1432. In this embodiment, the valve pin head 1434 is made of magnetically responsive material, so that the valve pin head 1434 is attractively aligned with the magnet 1432. The resulting the magnetic force is an attractive magnetic force that tends to pull the valve pin head 1434 towards the magnet 1432 and into a stopped position against the magnet 1432. In other embodiments, the magnet 1432 and the valve pin head 1434 can include or be replaced by other combinations of permanent magnets, electromagnets, and magnetically responsive material. Embodiments using repulsive magnetic forces are also possible (see FIG. 7).

The magnetic coupling 1424 couples the valve pin 1420 to the movable part 1425 of the actuator 1404. The magnet 1432 directly transmits actuator closing force to the valve pin head 1434 when the valve pin 1420 is being closed (i.e., moved down) by pushing on the valve pin head 1434. The magnet 1432 also pulls the valve pin 1420 upwards by the attractive magnetic force acting on the valve pin head 1434, when the valve pin 1420 is being opened. During normal operation, the magnetic force is sufficient to keep the valve pin 1420 coupled to the movable part 1425 of the actuator 1404 when the valve pin 1420 is opened and closed. If the valve pin becomes immovable, the attractive magnetic force is overcome, so that the immobilized valve pin 1420 is decoupled from the magnet 1432 (see FIG. 13, for example).

Figure 15:
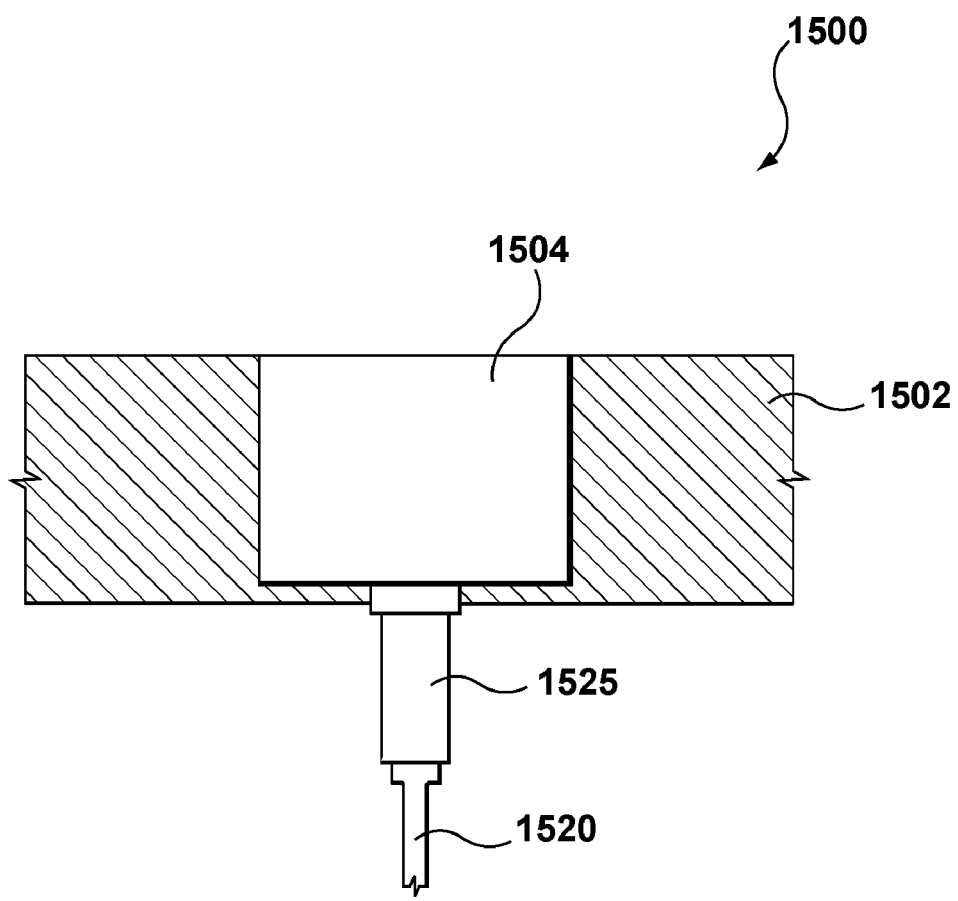
FIG. 15 is a cross-sectional view of part of an injection molding apparatus according to another embodiment of the present invention.

FIG. 15 shows part of an injection molding apparatus 1500 according to an embodiment of the present invention. The features and aspects described for the other embodiments can be used accordingly with the present embodiment. Only differing features are described in detail.

An actuator 1504 is coupled to a back plate 1502. A valve pin 1520 (second magnetic part) is positioned adjacent a moveable part 1525 (first magnetic part) of the actuator 1504. The valve pin 1520 is made of magnetically responsive material and is attractively aligned with the moveable part 1525, which is a permanent magnet or an electromagnet. Therefore, the valve pin 1520 and the movable part 1525 of the actuator 1504 form a magnetic coupling. Operation is similar to the other embodiments, with the valve pin 1520 decoupling from the movable part 1525 of the actuator 1504 when the attractive magnetic force is overcome.

Figure 16:
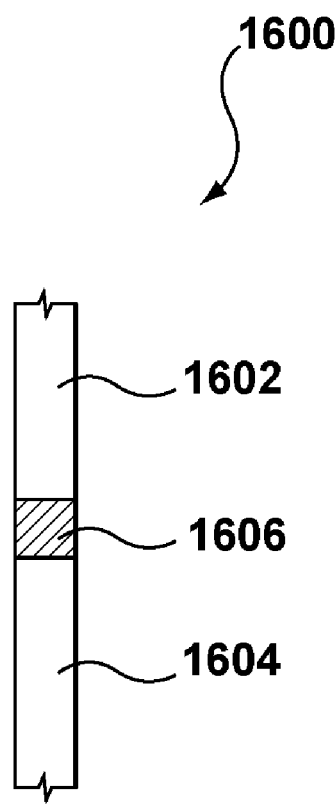
FIG. 16 is a cross-sectional view of a portion of a valve pin according to an embodiment of the present invention.

FIG. 16 shows a portion of a valve pin 1600 according to an embodiment of the present invention. The features and aspects described for the other embodiments can be used accordingly with the present embodiment. Only differing features are described in detail.

The valve pin 1600 includes an upper portion 1602, a lower portion 1604, and a magnet 1606 between the upper portion 1602 and the lower portion 1604. In normal operation, when the upper portion 1602 is pushed down by an actuator (not shown), the upper portion 1602 pushes the magnet 1606 down, which pushes the lower portion 1604 of the valve pin 1600 down in a direct manner. When the upper portion 1602 is pulled up by the actuator, the attractive magnetic force provided by the magnet 1606 magnetically couples the upper portion 1602 to the lower portion 1604, so that the lower portion 1604 is pulled up as well. In the lower portion 1604 becomes immobilized, when the upper portion 1602 is pulled up by the actuator, the magnet 1606 remains coupled to either the upper portion 1602 or the lower portion 1604 while the attractive magnetic force is overcome and upper portion 1602 and the lower portion 1604 separate. Both the upper and lower portions 1602, 1604 can be made of magnetically attractive material. Or one of the upper and lower portions 1602, 1604 can be made of magnetically attractive material while the other is not, in which case, the magnet 1606 is fixed (e.g., by adhesive, mechanically, etc) to the non-magnetically attractive portion. The magnet 1606 can be a permanent magnet or an electromagnet.

In embodiments described herein, supplementary components have been omitted for clarity. For example, a designer may choose to provide many of the threaded components described with lock nuts or another mechanism to stop the threads from working free over time.

In addition, the valve pins described are down-closed and up-open. Reverse gating (up-closed, down-open) and lateral gating (e.g., edge gating) are also possible.

Moreover, structure, such as a valve pin plate, located near permanent magnets can be provided with cooling channels or cooling devices, if the expected operating temperature is higher than the allowable temperature for the type of magnet used.

Regarding the mechanical functionality of the embodiments described above, electromagnets are equivalent to permanent magnets. Electromagnets, however, can be shut off such that a valve pin can be taken out of service regardless of the magnitude of any valve-pin immobilizing force. On the other hand, permanent magnets do not require wiring, electrical conduits, and and/or control. The choice between electromagnets and permanent magnets is left to a designer, who can take into account these differences and any others.

Lastly, the terms fixed, connected, coupled, etc used herein do not exclude indirect connections between parts. For example, a part can be fixed to another part with any number of parts in between or none at all (i.e., directly fixed). In addition, parts described as fixed, connected, coupled, etc can also be integral, if the resulting functionality is not changed.

Although many embodiments of the present invention have been described, those of skill in the art will appreciate that other variations and modifications may be made without departing from the spirit and scope thereof as defined by the appended claims. All patents and publications discussed herein are incorporated in their entirety by reference thereto.

What is claimed is:

1. A magnetic coupling for coupling a hot-runner valve pin to an actuator, comprising:

a first magnetic part for connection to an actuator or a valve pin plate; and a second magnetic part for connection to a valve pin, the second magnetic part being positioned to establish a magnetic force with the first magnetic part, and the second magnetic part being moveable with respect to the first magnetic part;

wherein the second magnetic part has a stopped position relative to the first magnetic part and the magnetic force tends to force the second magnetic part into the stopped position.

2. The magnetic coupling of claim 1, wherein the second magnetic part is attractively aligned with the first magnetic part and the magnetic force is an attractive magnetic force.

3. The magnetic coupling of claim 2, wherein the first magnetic part defines the stopped position.

4. The magnetic coupling of claim 2, wherein the first magnetic part comprises a permanent magnet or an electromagnet and the second magnetic part comprises a permanent magnet or an electromagnet.

5. The magnetic coupling of claim 2, wherein one of the first and second magnetic parts comprises a permanent magnet or an electromagnet and the other of the first and second magnetic parts comprises magnetically responsive material.

6. The magnetic coupling of claim 1, wherein the second magnetic part is repulsively aligned with the first magnetic part and the magnetic force is a repulsive magnetic force.

7. The magnetic coupling of claim 6, further comprising a stopper that defines the stopped position.

8. The magnetic coupling of claim 6, wherein the first magnetic part comprises a permanent magnet or an electromagnet and the second magnetic part comprises a permanent magnet or an electromagnet.

9. The magnetic coupling of claim 1, further comprising a housing for connecting the first magnetic part to the actuator or the valve pin plate, wherein the first magnetic part is fixed to the housing and the second magnetic part is slidable in the housing.

10. The magnetic coupling of claim 9, wherein the housing is the valve pin plate.

11. An injection molding apparatus, comprising:
an actuator having a stationary part and a movable part;
a manifold stationary relative to the stationary part of the actuator, the manifold defining a manifold channel;
a nozzle connected to the manifold, the nozzle defining a nozzle channel in communication with the manifold channel;
a valve pin extending through the nozzle for controlling flow of molding material in the nozzle channel; and
a magnetic coupling that couples the movable part of the actuator to the valve pin.

12. The injection molding apparatus of claim 11 further comprising a valve pin plate fixed to the movable part of the actuator, wherein a plurality of magnetic couplings comprise one or more first magnetic parts fixed to the valve pin plate and plurality of second magnetic parts positioned to establish a magnetic force with the first magnetic part.

13. The injection molding apparatus of claim 12, wherein the second magnetic parts are connected to a plurality of valve pins.

14. The injection molding apparatus of claim 12, wherein the second magnetic parts comprise heads of a plurality of valve pins.

15. The injection molding apparatus of claim 11, wherein the magnetic coupling comprises the movable part of the actuator and the head of the valve pin, wherein the movable part of the actuator comprises a permanent magnet or an electromagnet and the head of the valve pin comprises magnetically responsive material.

16. The injection molding apparatus of claim 11, wherein the magnetic coupling comprises an upper portion of the valve pin, a lower portion of the valve pin, and a magnet or electromagnet disposed therebetween.

17. The injection molding apparatus of claim 11, wherein the magnetic coupling comprises a first magnetic part and a second magnetic part, the second magnetic part having a stopped position relative to the movable part of the actuator, a magnetic force between the second magnetic part and the first magnetic part tending to force the second magnetic part into the stopped position.

18. The injection molding apparatus of claim 17, wherein the second magnetic part is attractively aligned with the first magnetic part to establish an attractive magnetic force therebetween.

19. The injection molding apparatus of claim 18, wherein the first magnetic part comprises a permanent magnet or an electromagnet and the second magnetic part comprises a permanent magnet or an electromagnet.

20. The injection molding apparatus of claim 18, wherein one of the first and second magnetic parts comprises a permanent magnet or an electromagnet and the other of the first and second magnetic parts comprises magnetically responsive material.

21. The injection molding apparatus of claim 17, wherein the second magnetic part is repulsively aligned with the first magnetic part to establish a repulsive magnetic force therebetween.

22. The injection molding apparatus of claim 21, wherein the first magnetic part comprises a permanent magnet or an electromagnet and the second magnetic part comprises a permanent magnet or an electromagnet.

23. An injection molding apparatus, comprising:
an actuator having a stationary part and a movable part;
a manifold stationary relative to the stationary part of the actuator, the manifold defining a manifold channel;
a nozzle connected to the manifold, the nozzle defining a nozzle channel in communication with the manifold channel;
a valve pin extending through the nozzle for controlling flow of molding material in the nozzle channel; and
a magnetic coupling that couples the valve pin to the movable part of the actuator, wherein the magnetic coupling directly transmits an actuator closing force the valve pin when the valve pin is being closed and applies a magnetic force to move the valve pin when the valve pins is being opened, such that if the valve pin becomes immovable, the magnetic force is overcome by an actuator opening force so that the movable part of the actuator moves with respect to the immovable valve pin.

* * * * *